United States Patent
Marupaduga (10) Patent No.: US 11,337,113 B2
(45) Date of Patent: May 17, 2022

(54) USE OF UPLINK COMMUNICATION QUALITY AS BASIS TO CONTROL SPLIT-UPLINK OPERATION FOR DUAL-CONNECTIVITY SERVICE

(71) Applicant: Sprint Spectrum L.P., Overland Park, KS (US)

(72) Inventor: Sreekar Marupaduga, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 23 days.

(21) Appl. No.: 16/947,524

(22) Filed: Aug. 5, 2020

(65) Prior Publication Data

US 2022/0046554 A1 Feb. 10, 2022

(51) Int. Cl.
*H04W 24/10* (2009.01)
*H04W 28/08* (2009.01)
(Continued)

(52) U.S. Cl.
CPC ......... *H04W 28/085* (2013.01); *H04W 24/10* (2013.01); *H04W 28/0933* (2020.05); *H04W 28/10* (2013.01); *H04W 36/0069* (2018.08); *H04W 52/241* (2013.01); *H04W 52/365* (2013.01); *H04W 52/367* (2013.01); *H04W 72/042* (2013.01); *H04W 72/0453* (2013.01);
(Continued)

(58) Field of Classification Search
CPC ......... H04B 7/02–0495; H04B 17/0082–3913; H04L 5/003–0098; H04W 8/22–245; H04W 24/02–10; H04W 28/02–26; H04W 36/0005–385; H04W 40/005–38; H04W 52/18–50; H04W 60/005–06; H04W 72/005–14; H04W 76/10–50; H04W 84/02–16; H04W 88/005–12; H04W 92/02; H04W 92/04; H04W 92/10
See application file for complete search history.

(56) References Cited

U.S. PATENT DOCUMENTS 8,185,060 B2 5/2012 Agashe et al.
8,285,321 B2 10/2012 Ji et al.
(Continued)

OTHER PUBLICATIONS

Tariq Mumtaz, et al., "Dual Connectivity-Based Mobility Management and Data Split Mechanism in 4G/5G Cellular Networks," IEEE Access, vol. 8, May 20, 2020.

*Primary Examiner* — Timothy J Weidner (57) ABSTRACT

A method and system for controlling apportionment of uplink data flow of a UE having a first connection with a first access node and a second connection with a second access node. An example system could operate to determine an uplink data apportionment, defining what portion of the uplink data flow the UE should provide on the first connection versus what portion of the uplink data flow the UE should provide on the second connection, where determining the uplink data apportionment is based on (i) a comparison of uplink power headroom of the UE on the first connection with uplink power headroom of the UE on the second connection and/or (ii) a comparison of uplink noise on the first connection with uplink noise on the second connection. Further, the example system could then cause the UE to operate in accordance with the determined uplink data apportionment.

20 Claims, 6 Drawing Sheets

(51) Int. Cl.
- *H04W 28/10* (2009.01)
- *H04W 36/00* (2009.01)
- *H04W 52/24* (2009.01)
- *H04W 52/36* (2009.01)
- *H04W 72/04* (2009.01)
- *H04W 72/08* (2009.01)
- *H04W 76/15* (2018.01)
- *H04W 76/25* (2018.01)
- *H04W 76/34* (2018.01)
- *H04W 84/02* (2009.01)
- *H04W 88/06* (2009.01)
- *H04W 92/02* (2009.01)
- *H04W 92/10* (2009.01)

(52) U.S. Cl.
CPC ......... *H04W 72/082* (2013.01); *H04W 76/15* (2018.02); *H04W 76/25* (2018.02); *H04W 76/34* (2018.02); *H04W 84/02* (2013.01); *H04W 88/06* (2013.01); *H04W 92/02* (2013.01); *H04W 92/10* (2013.01)

(56) References Cited

U.S. PATENT DOCUMENTS

| | | |
|---|---|---|
| 9,392,515 B2 | 7/2016 | Wang et al. |
| 9,699,800 B2 | 7/2017 | Himayat et al. |
| 10,104,584 B2 | 10/2018 | Cai |
| 10,141,983 B2 | 11/2018 | Kim et al. |
| 10,237,735 B2 | 3/2019 | Kim et al. |
| 10,292,140 B2 | 5/2019 | Nam et al. |
| 10,314,055 B1 | 6/2019 | Marupaduga et al. |
| 2014/0254505 A1* | 9/2014 | Chakravarthy ... H04W 28/0221 |
| 2015/0085800 A1 | 3/2015 | Sivanesan et al. |
| 2016/0234714 A1 | 8/2016 | Basu Mallick et al. |
| 2019/0098606 A1 | 3/2019 | Sharma et al. |
| 2020/0153594 A1* | 5/2020 | Kumar ................. H04W 76/15 |
| 2021/0185747 A1* | 6/2021 | Kanamarlapudi .... H04W 76/15 |

* cited by examiner

USE OF UPLINK COMMUNICATION QUALITY AS BASIS TO CONTROL SPLIT-UPLINK OPERATION FOR DUAL-CONNECTIVITY SERVICE

BACKGROUND

A typical wireless communication system includes a number of access nodes that are configured to provide coverage in which user equipment devices (UEs) such as cell phones, tablet computers, machine-type-communication devices, tracking devices, embedded wireless modules, and/or other wirelessly equipped communication devices (whether or not user operated), can operate. Further, each access node could be coupled with a core network that provides connectivity with various application servers and/or transport networks, such as the public switched telephone network (PSTN) and/or the Internet for instance. With this arrangement, a UE within coverage of the system could engage in air-interface communication with an access node and could thereby communicate via the access node with various application servers and other entities.

Such a system could operate in accordance with a particular radio access technology (RAT), with communications from an access node to UEs defining a downlink or forward link and communications from the UEs to the access node defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And recently, the industry has been exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in RF spectrum) having a bandwidth and a center frequency and thus extending from a low-end frequency to a high-end frequency.

On the downlink and uplink channels, the coverage of each access node could define an air interface configured in a specific manner to define physical resources for carrying information wirelessly between the access node and UEs.

Without limitation, for instance, the air interface could be divided over time into a continuum of frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs.

In addition, certain resource elements on the example air interface could be reserved for special purposes. For instance, on the downlink, certain resource elements could be reserved to carry synchronization signals that UEs could detect as an indication of the presence of coverage and to establish frame timing, other resource elements could be reserved to carry a reference signal that UEs could measure in order to determine coverage strength, and still other resource elements could be reserved to carry other control signaling such as PRB-scheduling directives and acknowledgement messaging from the access node to served UEs. And on the uplink, certain resource elements could be reserved to carry random access signaling from UEs to the access node, and other resource elements could be reserved to carry other control signaling such as PRB-scheduling requests and acknowledgement signaling from UEs to the access node.

OVERVIEW

When a UE enters into coverage of such a system, the UE could detect threshold strong coverage of an access node on a carrier (e.g., a threshold strong reference signal broadcast by the access node on that carrier) and could then engage in random-access and connection signaling with the access node to establish an air-interface connection, such as a Radio Resource Control (RRC) connection, through which the access node will then serve the UE on the carrier.

Further, if the UE is not already registered for service with the core network, the UE could transmit to the access node an attach request, which the access node could forward to a core-network controller for processing. And the core-network controller and access node could then coordinate setup for the UE of one or more user-plane bearers, each including an access-bearer portion that extends between the access node and a core-network gateway that provides connectivity with a transport network and a data-radio-bearer (DRB) portion that extends over the air between the access node and the UE.

Once the UE is so connected and registered, the access node could then serve the UE over the air-interface connection, managing downlink air-interface communication of data to the UE and uplink air-interface communication of data from the UE.

For instance, when the core-network gateway receives user-plane data for transmission to the UE, the data could flow to the access node, and the access node could buffer the data, pending transmission of the data to the UE. With the example air-interface configuration noted above, the access node could then allocate downlink PRBs in an upcoming subframe for carrying at least a portion of the data, defining a transport block, to the UE. And the access node could then transmit to the UE in a control region of that subframe a Downlink Control Information (DCI) message that designates the allocated PRBs, and the access node could accordingly transmit the transport block to the UE in those designated PRBs.

Likewise, on the uplink, when the UE has user-plane data for transmission on the transport network, the UE could buffer the data, pending transmission of the data to the access node, and the UE could transmit to the access node a scheduling request that carries a buffer status report (BSR) indicating the quantity of data that the UE has buffered for transmission. With the example air-interface configuration noted above, the access node could then allocate uplink PRBs in an upcoming subframe to carry a transport block of the data from the UE and could transmit to the UE a DCI message that designates those upcoming PRBs. And the UE could then accordingly transmit the transport block to the access node in the designated PRBs.

For each such transmission on the downlink and the uplink, the receiving end (i.e., the UE or the access node) could determine whether it received the transport block successfully from the transmitting end (i.e., the access node or the UE). For instance, the transmission could carry a cyclic redundancy check (CRC) value computed based on the transport block, and the receiving end could compute a CRC based on the received transport block and determine whether its computed CRC matches that carried by the transmission. If the receiving end receives the transmission and determines that the CRC matches, then the receiving end could transmit to the transmitting end a positive acknowledgement (ACK) control message. Whereas, if the receiving end does not receive the transmission or determines that the CRC does not match and thus that there was an error in the received transport block, then the receiving end could transmit to the transmitting end a negative acknowledgement (NACK), in response to which the transmitting end could then attempt retransmission.

In addition, for each such transmission, the access node and UE could use a modulation and coding scheme (MCS), which the access node could select based on the UE's reported wireless channel quality and the access node could specify in its scheduling directive to the UE. The MCS could define a data coding rate that establishes how much of the data being communicated is actual user-plane data versus error correction information, and a modulation scheme that establishes how many bits can be carried per resource element. When the UE's reported channel quality is better, the access node may direct use of a higher-order MCS that maps to a higher coding rate and/or greater number of bits per resource element. Whereas, when the UE's reported channel quality is worse, the access node may direct use of a lower-order MCS that maps to a lower coding rate and/or lower number of bits per resource element.

Further, the UE could be equipped with a variable-gain power amplifier and associated logic that enables the UE to transmit on the uplink with dynamically set transmit power. And as the access node serves the UE, the access node and UE could regularly engage in a power control process to control the UE's transmit power.

In an example of such a power control process, an uplink receiver at the access node could estimate a signal-to-interference-plus-noise ratio (SINR) of transmission from the UE on a per subframe basis or the like and could compare that SINR with an SINR target (which might be dynamically set based on observed communication error rate). When the SINR is below the SINR target, the access node could then transmit to the UE a power-up transmit power control (TPC) command to which the UE would respond by incrementally increasing its transmit power. Whereas, when the SINR is above the SINR target, the access node could transmit to the UE a power-down TPC command to which the UE would respond by incrementally decreasing its transmit power.

The UE's ability to increment its transmit power, however, could be limited by a defined maximum transmit power level (e.g., maximum average transmit power level), e.g., a spectral absorption rate (SAR) limit, which could be established based on a power class of the UE for instance. Industry standards or governmental regulations define various UE power classes, and UEs could be characterized by their manufacturing specifications or other data to be a member of one power class or another. Without limitation, examples of such power classes include Power Class 2, defining a maximum transmit power of 23 dBm (about 200 milliwatts), and Power Class 3, defining a maximum transmit power of 26 dBm (about 400 milliwatts).

With this power limitation and the UE's variable transmit power, the UE may therefore have a variable level of "power headroom" that defines the difference between (i) the UE's currently set transmit power level based on the power control process and (ii) the UE's maximum transmit power. A positive power-headroom value would mean that the UE has transmit power to spare and can increase its transmit power more if directed to do so, whereas a zero or negative power-headroom value would mean that the UE has already reached its maximum transmit power level and may therefore be unable to transmit with sufficient power.

Each time the UE sends a scheduling request to the access node, the UE could include in the scheduling request a power-headroom report (PHR) indicating the UE's current power headroom. (Such a report may effectively indicate the UE's power headroom by providing a value that maps to, equals, or otherwise represents a difference between the UE's maximum transmit power and the UE's currently set transmit power.) And the access node could also use that reported power headroom as a basis to set or adjust the MCS that the access node will direct the UE to use for uplink transmission. If the power headroom is negative, for instance, the access node might artificially reduce the MCS-order from the MCS that corresponds with the UE's reported channel quality.

When the industry advances from one generation of wireless technology to the next, or in other scenarios, networks and UEs may also support dual connectivity (or non-standalone) service. Dual-connectivity service involves the UE being served concurrently on multiple air-interface connections, possibly with each connection operating according to a different respective RAT.

In an example such dual-connectivity implementation, the UE could have at least two separate and coexisting air-interface connections, including a primary connection with a first access node referred to as a master node (MN) and a secondary connection with a second access node referred to as a secondary node (SN), perhaps with a different RAT per connection. Further, the MN could be responsible for coordinating setup, management, and teardown of dual-connectivity service for the UE and functioning as an anchor point for RRC signaling and core-network control signaling related to the dual-connectivity service, and the SN could function mainly to provide added connectivity and increased aggregate bandwidth for the UE.

When the UE enters into coverage of such a system, the UE could initially scan for and discover threshold strong coverage of the MN, and the UE could then responsively engage in signaling as discussed above to establish a primary connection with the MN and to attach with the network. If the UE supports dual connectivity, the MN could then trigger and/or engage in a process to establish for the UE a secondary connection with the SN, so that the MN and SN can then cooperatively provide the UE with dual-connectivity service. Further, the MN could engage in signaling to establish for the UE a split bearer configuration so that the UE's data flow could be split between the MN and SN.

With dual connectivity, each access node could serve the UE respectively in the manner discussed above, scheduling downlink communication on its respective connection with the UE and scheduling uplink communication on its respective connection with the UE.

Further, for each of the UE's connections, the UE could apply a respective variable gain for its transmit power and could engage in a respective power control process with the respective serving access node as discussed above. Thus, the UE could have a respective power headroom per connection, which the UE could report to the access node serving that connection, and which the access node may use as described above as a basis to set or adjust the MCS that the access node will direct the UE to use for uplink transmission on that connection.

But with dual connectivity, the UE's maximum transmit power (e.g., per its power class) could restrict the UE's aggregate transmit power across its primary and secondary connections, i.e., requiring the UE's total transmit power on those coexisting connections to not exceed the limit. Therefore, the UE could apply a dynamic power sharing process to distribute its limited uplink transmit power across its connections.

In an example dynamic power sharing process, the UE could apply its maximum transmit power limit (e.g., the SAR limit) to its primary connection and, on a per subframe basis, could treat any remaining transmit power as the UE's maximum transmit power limit for its secondary connection.

More particularly, on a per subframe basis, the UE and MN could engage in a power control process as described above to establish the UE's transmit power and power headroom for the primary connection, and the UE and could treat that primary-connection power headroom as the UE's maximum transmit power for the secondary connection. Further, on a per subframe basis, the UE an SN could engage in a similar power control process as described above to establish the UE's transmit power and power headroom for the secondary connection, with the power headroom being the difference between the UE's dynamically set maximum transmit power for the second connection (i.e., the UE's primary-connection power headroom) and the UE's current transmit power setting for the second connection.

One technical issue that could arise when a UE is served with dual connectivity is how the UE should apportion its uplink data flow between its coexisting connections. With the arrangement described above, for instance, as the UE has data to transmit, at issue could be what portion of that data the UE should transmit on its primary connection to the MN and what portion of that data the UE should transmit on its secondary connection to the SN.

The present disclosure provides for dynamically establishing this or another such uplink apportionment based at least on a comparison of uplink communication quality of the UE's connections, and particularly based at least on a comparison of the UE's power headroom per connection and/or the level of uplink noise per connection.

As noted above, the UE's power headroom on a connection establishes how much the UE could increase its transmit power on that connection while staying within a defined maximum. Generally if and when a UE has a relatively high power headroom on a connection, that may be a sign that the access node serving the UE on that connection has been receiving the UE's transmissions with relatively high SINR, which is desirable. Whereas, if and when a UE has a relatively low power headroom on a connection, that may be a sign that the access node serving the UE on that connection has been receiving the UE's transmissions with relatively low SINR, which is undesirable.

Therefore, in one respect, the present disclosure provides for apportioning the UE's uplink data flow between the UE's connections with an apportionment ratio based on a comparison of the UE's power headroom per connection. This can involve giving more apportionment weight to a connection based on the UE having higher power headroom on that connection, and vice versa. For instance, if and when the UE's power headroom on the primary connection is twice the UE's power headroom on the secondary connection, the UE could apportion its uplink data flow such that the UE transmits on the primary connection about two times the quantity of data that the UE transmits on the secondary connection.

In addition or alternatively, uplink noise respectively per connection could be a useful basis for the UE's uplink data apportionment, as high uplink noise on a connection could make it difficult for the access node that is serving the UE on that connection to successfully receive and decode transmissions from the UE. In particular, this difficulty could result in increased uplink transport-block errors and consequently an increased rate of uplink retransmission, which could correlate with reduced uplink throughput.

Therefore, in another respect, the present disclosure also provides for apportioning the UE's uplink data flow between the UE's connections with an apportionment ratio based on a comparison of uplink noise per connection. This can involve giving less apportionment weight to a connection based on the connection having higher uplink noise, and vice versa. For instance, if and when the uplink noise on the UE's primary connection is twice the uplink noise on the UE's secondary connection, the UE could apportion its uplink data flow such that the UE transmits on the primary connection about half the quantity of data that the UE transmits on the secondary connection.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

An example implementation will now be described in the context of 4G LTE, 5G NR, and 4G-5G dual connectivity, referred to as E-UTRA-NR Dual Connectivity (EN-DC).

With EN-DC, a 4G LTE access node (4G evolved Node-B (eNB)) functions as the MN, and a 5G NR access node (5G next-generation Node-B (gNB)) functions the SN. Thus, a UE could first establish a standalone 4G connection with a 4G eNB, and the 4G eNB could then coordinate setup of EN-DC service for the UE, including setup for the UE of a secondary 5G connection with the 5G gNB. And the 4G eNB and 5G gNB could then concurrently serve the UE over their respective 4G and 5G connections with the UE.

It should be understood, however, that the principles disclosed herein could extend to apply with respect to other scenarios as well, such as with respect to other RATs and other dual-connectivity configurations. Further, it should be understood that other variations from the specific arrangements and processes described are possible. For instance, various described entities, connections, functions, and other elements could be added, omitted, distributed, re-located, re-ordered, combined, or changed in other ways. In addition, it will be understood that technical operations disclosed as being carried out by one or more entities could be carried out at least in part by a processing unit programmed to carry out the operations or to cause one or more other entities to carry out the operations.

Figure 1:
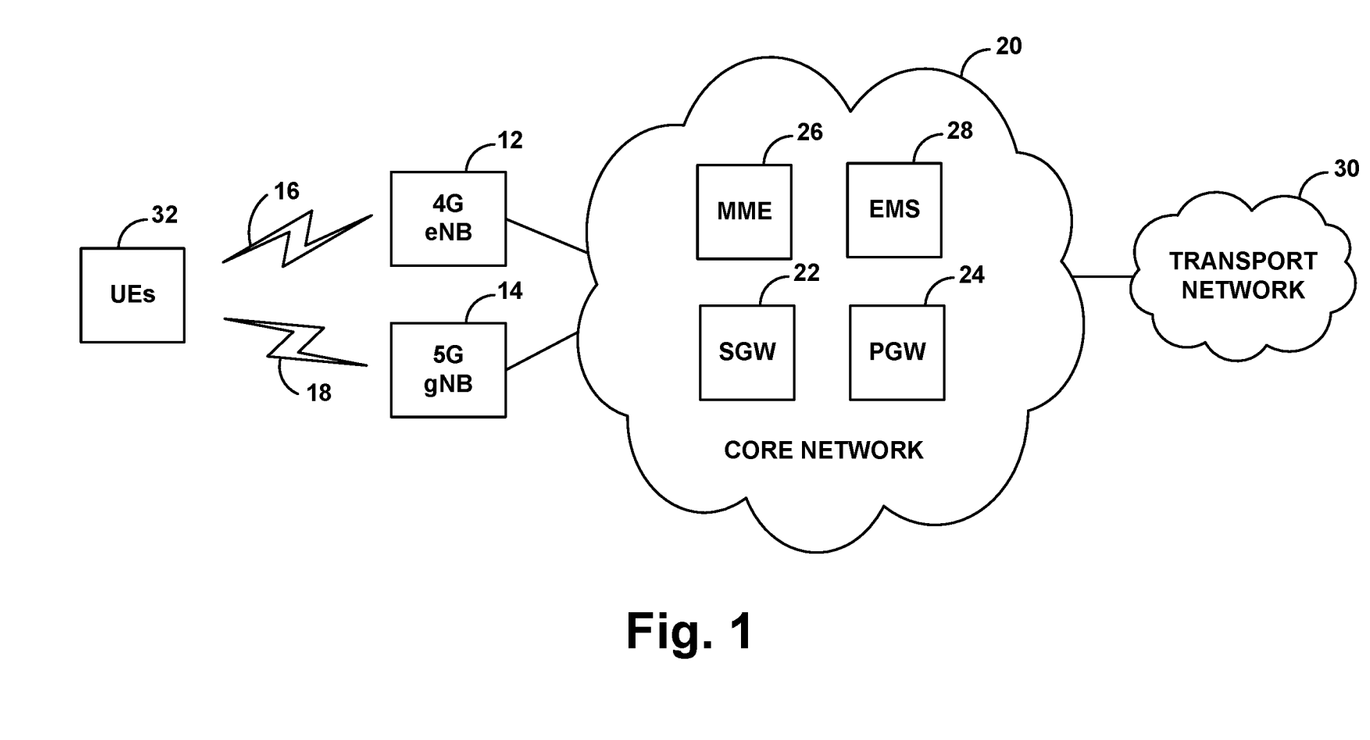
FIG. 1 is a simplified block diagram of an example network arrangement in which features of the present disclosure can be implemented.

FIG. 1 is a simplified block diagram of an example network arrangement including a 4G eNB 12 and a 5G gNB 14. Either or each of these access nodes could be a macro access node of the type configured to provide a wide range of coverage or could take other forms, such as a small cell access node, a femtocell access node, or the like, possibly configured to provide a smaller range of coverage. Further, the access nodes may or may not be collocated with each other, e.g. in a common cell site with collocated RF points of origin.

Each access node could have a respective antenna structure, perhaps an antenna array or a portion of shared antenna array, that is configured to transmit and receive electromagnetic signals in a region defined by an antenna pattern or radiation pattern. Further, each access node could be configured to provide coverage on at least one respective carrier according to a respective RAT, with each carrier being FDD or TDD as noted above. Namely, the 4G eNB 12 could provide 4G coverage on one or more carriers 16, and the 5G eNB 14 could provide 5G coverage on one or more carriers 18.

Further, the air interface on each carrier could be structured as described above by way of example, being divided over time into frames, subframes, and symbol time segments, and over frequency into subcarriers, thus defining an array of air-interface resource elements grouped into PRBs allocable by the access node as noted above, for use to carry data to or from served UEs. Carrier-structure and/or service on the 4G and 5G air-interfaces, however, could differ from each other in various ways now known or later developed, such as with one implementing variable subcarrier spacing and the other having fixed subcarrier spacing, with one having flexible TDD configuration and the other having fixed TDD configuration, with one having different subcarrier spacing and/or symbol time segment length than the other, and/or with one making different use of MIMO technologies than the other, among other possibilities.

In the example arrangement of FIG. 1, both access nodes are interfaced with a core network 20, such as an Evolved Packet Core (EPC) network or Next Generation Core (NGC) network. Though the access nodes could alternatively interface with different and/or separate core networks. In the example shown, the core network 20 includes a serving gateway (SGW) 22, a packet data network gateway (PGW) 24, a mobility management entity (MME) 26, and an element management system (EMS) 28, although other arrangements are possible as well.

In an example implementation, without limitation, each access node could have an interface with the SGW 22, the SGW 22 could have an interface with the PGW 24, and the PGW 24 could provide connectivity with a transport network 30. Further, each access node could have an interface with the MME 26, and the MME 26 could have an interface with the SGW 22, so that the MME 26 could coordinate setup of bearers for UEs to enable the UEs to engage in packet-data communication via 4G and 5G. Alternatively, just the 4G eNB 12 might have an interface with the MME 26 and may function as an anchor for signaling with the MME 26 both for 4G service and for 5G and EN-DC service. In addition, the access nodes could have an interface with each other, perhaps an X2 interface, to facilitate inter-access node signaling.

Still further, the EMS 28 could operate as a central repository of operational data for the wireless communication network and to control and manage operation of various network elements such as the access nodes.

FIG. 1 also illustrates an example UE 32 within coverage of the 4G eNB 12 and the 5G gNB 14. This UE could be equipped with a 4G LTE radio and/or a 5G NR radio and could include associated circuitry and logic that enables the UE to engage in 4G LTE service, 5G NR service, and EN-DC service.

In line with the discussion above, upon entering into coverage of this network, the example UE 32 could scan for and discover threshold strong coverage of the 4G eNB 12 on a carrier 16 and could then responsively engage in random access and RRC signaling with the 4G eNB 12 to establish a 4G connection with the 4G eNB 12 on that carrier. Further, the 4G eNB 12 could establish in data storage a context record for the UE and could store in the context record an identification of the UE's established 4G connection and various information related to the connection.

In addition, the UE could then transmit to the 4G eNB 12 an attach request if appropriate, which the 4G eNB 12 could forward to the MME 26 for processing. And after authenticating the UE, the MME 26 could coordinate setup for the UE of one or more user-plane bearers. For instance, for each such bearer, the MME 26 could engage in signaling with the 4G eNB 12 and the SGW 22 to set up for the UE an S1-U packet tunnel between the 4G eNB 12 and the SGW 22, the SGW 22 could responsively engage in signaling with the PGW 24 to set up for the UE an S5 packet tunnel between the SGW 22 and the PGW 24, and the 4G eNB 12 could engage in signaling with the UE to set up for the UE a DRB over the air between the UE and the 4G eNB 12. Further, the 4G eNB 12 could store a record of each such bearer in the UE context record.

Operating as an MN, the 4G eNB 12 could then work to configure EN-DC service for the UE.

For instance, the 4G eNB 12 could first select 5G gNB 14 to be an SN for the UE, perhaps based on the UE scanning for 5G coverage and reporting to the 4G eNB 12 that the UE detected threshold strong coverage of 5G gNB 14. And the 4G eNB 12 could then engage in a process to add 5G gNB 14 as an SN for the UE, such as by transmitting to the 5G gNB 14 an SN-Addition request to cause the 5G gNB 14 to allocate resources for a 5G connection for the UE on a 5G carrier 18, receiving an SN-Addition-Request acknowledge message from the 5G gNB 16, and engaging in associated RRC signaling with the UE, in response to which the UE could then access and complete establishment of the 5G connection.

Further, for each of one or more bearers established for the UE, the 4G eNB 12 could engage in signaling with the MME 26, with the 5G gNB 14, and with the UE, to establish and manage a split-bearer configuration enabling the 4G eNB 12 to serve a portion of the UE's data communications and the 5G gNB 14 to serve another portion of the UE's data communications.

Various split-bearer arrangements are possible.

In one arrangement, the UE's bearer could be split at the SGW 22, with one bearer leg extending between the SGW 22 and the 4G eNB 12 and another bearer leg extending between the SGW 22 and the 5G gNB 14. For instance, while maintaining the UE's S1-U tunnel between the 4G eNB 12 and the SGW 22, the MME 26 could coordinate setup of a secondary S1-U tunnel between the 5G gNB 14 and the SGW 22. With this arrangement, communications between the UE and the 4G eNB 12 could flow over the tunnel between the 4G eNB 12 and the SGW 22, and communications between the UE and the 5G gNB 14 could flow over the tunnel between the 5G gNB 14 and the SGW 22.

In another implementation, the split bearer could be established at the 5G gNB 14, with the UE's S1-U tunnel extending between the SGW 22 and the 5G gNB 14 and a leg of the bearer extending over an X2 interface between the 5G gNB 14 and the 4G eNB 12. For instance, the MME 26 could coordinate transfer of the UE's S1-U tunnel from being between the SGW 22 and the 4G eNB 12 to instead being between the SGW 22 and the 5G gNB 14, and the 4G eNB 12 and 5G gNB 14 could coordinate setup of the bearer leg between the 4G eNB 12 and the 5G gNB 14. With this arrangement, communications between the 5G gNB 14 and the UE could flow over the S1-U tunnel between the 5G gNB 14 and the SGW 22, and communications between the 4G eNB 12 and the UE could flow between the 4G eNB 12 and the 5G gNB 14 and likewise over the S1-U tunnel between the 5G gNB 14 and the SGW 22.

And in yet another implementation, the split bearer could be established at the 4G eNB 12, with the UE's S1-U tunnel still extending between the SGW 22 and the 4G eNB 12, and with a leg of the bearer extending between the 4G eNB 12 and the 5G gNB 14. For instance, the 4G eNB 12 could maintain the S1-U tunnel between the 4G eNB 12 and the SGW 22, and the 4G eNB 12 and 5G gNB 14 could coordinate setup of the bearer leg between the 4G eNB 12 and the 5G gNB 14. With this arrangement, communications between the 4G eNB 12 and the UE could flow over the S1-U tunnel between the 4G eNB 12 and the SGW 22, and communications between the 5G gNB 14 and the UE could flow between the 5G gNB 14 and the 4G eNB 12 and likewise over the S1-U tunnel between the 4G eNB 12 and the SGW 22.

With dual-connectivity service so established through this and/or other steps, the 4G eNB 12 and 5G gNB 14 could then concurrently serve the UE over their respective connections with the UE, each in the manner discussed above for instance.

Namely, when the 4G eNB 12 has data buffered for transmission over the 4G connection to the UE, the 4G eNB 12 could schedule and provide transmission of that data on the 4G connection to the UE. And when the 5G gNB 14 has data buffered for transmission over the 5G connection to the UE, the 5G gNB 14 could schedule and provide transmission of that data on the 5G connection to the UE.

And likewise, when the UE has data buffered for transmission on the 4G connection to the 4G eNB 12, the UE could send to the 4G eNB 12 a scheduling request for that transmission, the 4G eNB 12 could schedule the transmission on the 4G connection, and the UE could accordingly engage in that transmission on the 4G connection. And when the UE has data buffered for transmission on the 5G connection to the 5G gNB 14, the UE could send to the 5G gNB 14 a scheduling request for that transmission, the 5G gNB 14 could schedule the transmission on the 5G connection, and the UE could accordingly engage in that transmission the 5G connection.

As noted above, the present disclosure provides for controlling how the UE will apportion its uplink data flow between its coexisting connections. In the example arrangement of FIG. 1, for instance, at issue could be how the UE will apportion the UE's uplink data flow between its 4G connection and its 5G connection. Namely, at issue could be, when the UE has data to transmit, what portion of the data the UE should transmit on the UE's 4G connection versus what portion of the data the UE should transmit on the UE's 5G connection.

In an example implementation, the UE may maintain a separate buffer respectively for each connection, and at issue may be what portion of the UE's uplink data the UE should buffer for transmission on the 4G connection and then transmit on the 4G connection versus what portion of the UE's uplink data the UE should buffer for transmission on the 5G connection and then transmit on the 5G connection. Alternatively, the UE may have a single uplink buffer in which the UE buffers data for uplink transmission, and at issue could be what portion of that data the UE deems to be effectively buffered for transmission on the 4G connection and the UE will thus transmit on the 4G connection versus what portion of that data the UE deems to be effectively buffered for transmission on the 5G connection and the UE will thus transmit on the 5G connection. Other implementations are possible as well.

At issue here could be, of the total quantity of data that the UE has for uplink transmission (perhaps specifically on a given bearer and/or for a given communication service), what percentage of the data the UE will transmit on the 4G connection versus what percentage of the data the UE will transmit on the 5G connection. These percentages could add up to 100%, defining a straight data split between the two connections. Or if the UE would send any data on both of the connections (i.e., sending the same data on both connections), the percentages could add up to more than 100%.

The percentage allocation per connection could thus define an apportionment ratio. For instance, if the UE would transmit 30% of its data on the 4G connection and the other 70% of its data on the 5G connection, then the apportionment ratio could be 30:70. Whereas, if the UE would transmit 20% of its data on the 4G connection and the other 80% of its data on the 5G connection, then the apportionment ratio could be 20:80 (or 1:4). And if the UE would transmit 50% of its data on the 4G connection and the other 50% of its data on the 5G connection, then the apportion ratio could be 50:50 (or 1:1).

In the example EN-DC implementation, the 4G eNB 12, as MN, could control this apportionment by the UE. For instance, based on one or more factors, the 4G eNB 12 could determine the apportionment (e.g., a percentage respectively per connection) that the UE should apply, and the 4G eNB 12 could transmit to the UE an RRC message that specifies the determined apportionment, thus directing the UE to apply that apportionment. And the UE could respond to that directive by configuring itself to apply the specified apportionment, such as by recording an indication that will accordingly govern operation of the UE.

Alternatively, the UE itself could control its apportionment. For instance, based on one or more factors, the UE could determine the apportionment that the UE should apply. And the UE could respond to that determination by configuring itself to apply the determined apportionment, such as likewise by recording an indication that will accordingly govern operation of the UE.

When the UE has data to transmit, the UE could thus apply the configured apportionment. For instance, if the apportionment between the 4G connection and the 5G connection is 1:4, then for every unit of data that the UE transmits on the 4G connection, the UE could transmit four units of data on the 5G connection. Or if the apportionment between the 4G connection and the 5G connection is 1:1, then for every unit of data that the UE transmits on the 4G connection, the UE could also transmit a unit of data on the 5G connection.

Note that this apportionment configuration could be an initial configuration. Or if the UE is already configured to apply a first apportionment, this could be a re-configuration of the UE's apportionment from the first apportionment (e.g., a first apportionment ratio) to a second, different apportionment (e.g., a second apportionment ratio). Further, note that the apportionment could relate to the raw data that the UE will transmit, before any application of coding schemes as noted above such as before addition of error-correction data, or the apportionment could relate to encoded data to be transmitted by the UE. And the apportionment may or may not account for retransmissions as well.

In line with the discussion above, the present disclosure provides for using the UE's power headroom per connection and/or the uplink noise per connection as a basis to establish the apportionment of the UE's uplink data flow between the 4G connection and the 5G connection. Either or both of these metrics could be used, possibly together with one or more other metrics, as a basis to establish the apportionment.

In an example implementation, the apportionment could be established by scoring each connection with a weight based on each of one or more such metrics, and then establishing a ratio of the connections' scores. For instance, if a metric is desirable (such as power headroom rather than uplink noise), then a weight factored into a connection's score could be made proportional to the metric's value, to increase the connection's score as the connection has a higher value of the metric, and to decrease the connection's score as the connection has a lower value of the metric. Whereas, if a metric is undesirable (such as uplink noise rather than power headroom), then a weight factored into a connection's score could be made inversely proportional to the metric's value, to decrease the connection's score as the connection has a higher value of the metric, and to increase the connection's score as the connection has a lower value of the metric.

As to power headroom, the EN-DC-connected UE could engage in uplink power control respectively for each of its connections, perhaps with the dynamic power sharing process noted above. Therefore, for each connection could have a respective power headroom that the UE could report to access node serving the UE on that connection. Namely, the UE could have a power headroom for the UE's 4G connection, which the UE could report to the 4G eNB 12 in 4G scheduling requests or at other times. And the UE could have a power headroom for the UE's 5G connection, which the UE could report to the 5G gNB 14 in 5G scheduling request or at other times.

In an example implementation, the 4G eNB 12 could determine an uplink data apportionment for the UE based at least on these power headroom values. For instance, the 4G eNB 12 could establish the UE's uplink apportionment ratio as or based on a comparison of the UE's power headroom values on the connections, perhaps as a ratio of the power headroom values, among other possibilities.

By way of example, if the UE's power headroom on the 4G connection is $PH_{4G}$ and the UE's power headroom on the 5G connection is $PH_{5G}$, then the 4G eNB 12 could set the UE's apportionment ratio to be $PH_{4G}:PH_{5G}$, on a linear or logarithmic scale. That way, for instance, for every $PH_{4G}$ units of data that the UE transmits on the 4G connection, the UE could transmit $PH_{5G}$ units of data on the 5G connection, on a linear or logarithmic scale. Alternatively, the 4G eNB 12 could factor the UE's per-connection power headroom into the apportionment determination in other ways as suggested above for instance.

To facilitate this, the 4G eNB 12 could refer to its stored UE context record to determine the UE's latest reported 4G-connection power headroom. Further, the 4G eNB 12 could learn the UE's latest reported 5G-connection power headroom through signaling (e.g., push or pull reporting) from the 5G gNB 14. Or if the EMS 28 has a record of his power-headroom information, the 4G eNB 12 could learn the UE's latest reported 5G-connection power headroom through signaling (e.g., push or pull) from the EMS 28. The 4G eNB 12 could then use these power headroom metrics as a basis to determine the UE's uplink data apportionment.

Alternatively, the EMS 28 or another computing system could determine an uplink data apportionment for the UE based on the UE's power headroom per connection and could transmit an indication of the established uplink data apportionment to the 4G eNB 12. The 4G eNB 12 could thus determine the uplink data apportionment for the UE by receiving this transmitted indication.

Having determined the UE's uplink data apportionment based at least on the UE's power headroom per connection, the 4G eNB 12 could then transmit to the UE an RRC message that specifies the determined uplink data apportionment, and the UE could configure itself to accordingly apply the specified apportionment.

In another example implementation, the UE itself, knowing its power headroom respectively for each of its connections, could likewise establish its uplink data apportionment based at least on those power headroom values, and the UE could configure itself to accordingly apply the established uplink data apportionment.

As to uplink noise, on the other hand, each of the EN-DC-connected UE's connections could have a respective level of uplink noise, which, as noted above, may impact the access node's ability to successfully receive and decode transmissions from the UE on the connection.

Such uplink noise could arise from other electromagnetic radiation that exists in the uplink frequency channel of the carrier on which the connection is defined. In particular, sources of this noise could include natural RF radiation (e.g., atmospheric interference), other served UEs transmitting to the access node on the same or similar frequencies, other wireless operators operating on the same or similar frequencies, or other nearby devices (e.g., transformers or other electronic systems) radiating on the same or similar frequencies, among other examples. The uplink noise may thus include both naturally occurring noise and signal interference as artificially created noise.

In practice, each access node could regular monitor the level of uplink noise on the carrier on which the UE's respective connection with the access node is defined. The access node could regularly measure the uplink noise on the carrier by measuring a level of electromagnetic energy on the uplink frequency channel of the carrier, perhaps at times when there is no uplink transmission scheduled on the carrier so that the measured energy could represent an uplink noise-floor (on top of which scheduled uplink communications would occur). Further, the access node could measure this uplink energy level across the carrier's full uplink bandwidth or perhaps specifically on an uplink shared channel or other portion of the carrier, among other possibilities.

In an example implementation, the 4G eNB 12 could determine an uplink data apportionment for the UE based at least on these uplink noise values. For instance, the 4G eNB 12 could establish the UE's uplink apportionment ratio as or based on a comparison of the levels of uplink noise on the connections, perhaps as a ratio of the reciprocal of the uplink noise values, i.e., as the inverse ratio of the uplink noise values, among other possibilities.

By way of example, if the uplink noise on the 4G connection is $N_{4G}$ and the uplink noise on the 5G connection is $N_{5G}$, then the 4G eNB 12 could set the UE's apportionment ratio to be $N_{5G}:N_{4G}$, on a linear or logarithmic scale. That way, for every $N_{5G}$ units of data that the UE transmits on the 4G connection, the UE could transmit $N_{4G}$ units of data on the 5G connection. Alternatively, the 4G eNB 12 could factor the per-connection uplink noise into the apportionment determination in other ways as suggested above for instance.

To facilitate this, the 4G eNB 12 could refer to its own latest measurement of uplink noise on the UE's 4G connection. And the 4G eNB 12 could learn a latest measurement of uplink noise on the UE's 5G connection, likewise through signaling from the 5G gNB 14 or—if the EMS 28 has a record of this information—from the EMS 28. The 4G eNB 12 could then use these uplink noise metrics as a basis to determine the UE's uplink data apportionment.

Alternatively, the EMS 28 or another computing system could determine an uplink data apportionment for the UE based on the uplink noise per connection and could transmit an indication of the established uplink data apportionment to the 4G eNB 12. The 4G eNB 12 could thus determine the uplink data apportionment for the UE by receiving this transmitted indication.

Having determined the UE's uplink data apportionment based at least on the uplink noise per connection, the 4G eNB 12 could then transmit to the UE an RRC message that specifies the determined uplink data apportionment, and the UE could configure itself to accordingly apply the specified apportionment.

Note that this process can be repeatedly carried out, e.g. on a per subframe, per frame, or other basis, to dynamically control the UE's uplink data apportionment as uplink communication quality (e.g., power headroom and/or uplink noise) per connection changes.

Further, note that in some scenarios, the decision on apportionment could be a decision to have the UE operate with a single-connection-uplink mode rather than a split-uplink mode, by apportioning zero data to one of the UE's connections. This decision could be responsive to a determination that that one connection has threshold poor uplink communication quality and/or that the uplink communication quality on that one connection is threshold worse than the uplink communication quality on the other connection.

By way of example, as to power headroom, the 4G eNB 12 could determine that the UE's power headroom on a first one of the UE's connections is negative or lower than another defined threshold possibly deemed by engineering design to be problematic (and perhaps further that that is not the case with the UE's power headroom on the second connection), and/or that the UE's power headroom on the first connection is at least a defined threshold extent lower than UE's power headroom on the second connection. And in response to that determination, the 4G eNB 12 could configure the UE to operate in the single-connection-uplink mode such as by directing the UE to apportion 100% of its uplink communications to the second connection. Or the UE could make a similar determination and configure itself accordingly.

Likewise, as to uplink noise, the 4G eNB 12 could determine that the uplink noise on a first one of the UE's connections is at least as high as a defined threshold possibly deemed by engineering design to be problematic (e.g., −85 dBm or so) (and perhaps further that that is not the case with the uplink noise on the second connection), and/or that the uplink noise on the first connection is at least a defined extent higher than the uplink noise on the second connection. And in response to this determination, the 4G eNB 12 could configure the UE to operate in the single-connection-uplink mode on the second connection, such as by directing the UE to apportion 100% of its uplink communications to the second connection. Or here too, the UE could make a similar determination and configure itself accordingly.

Figure 2:
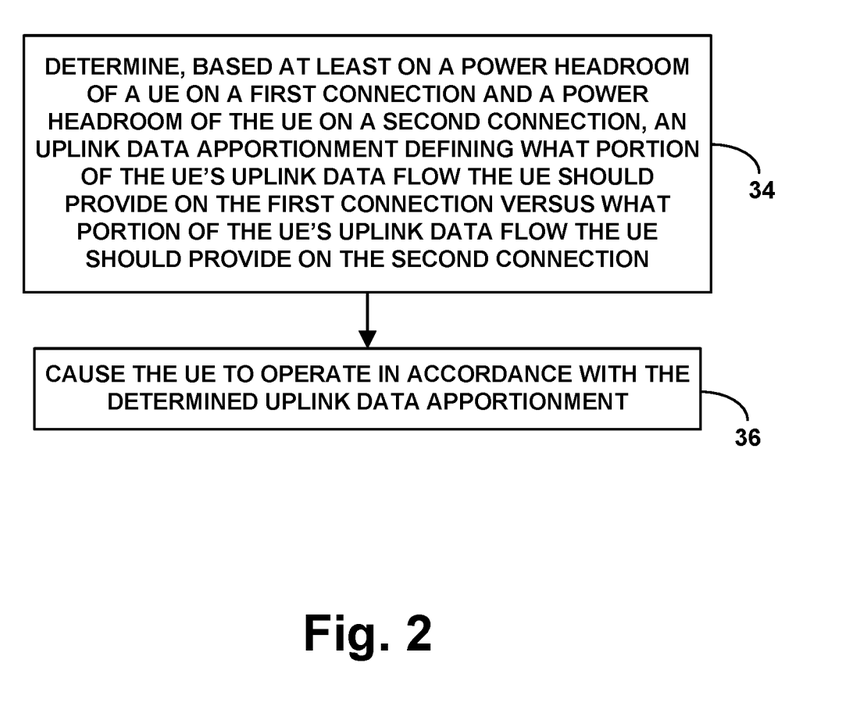
FIG. 2 is a flow chart depicting an example method in accordance with the disclosure.

FIG. 2 is a flow chart depicting a method that could be carried out in accordance with the present disclosure, to control apportionment of uplink data flow of a dual-connected UE. In particular, the method could be operable in a communication system including first and second access nodes, in a scenario where the UE has coexisting air-interface connections with the access nodes, including a first connection with the first access node and a second connection with the second access node.

As shown in FIG. 2, at block 34, the method includes determining, based at least on a power headroom of the UE on the first connection and a power headroom of the UE on the second connection, an uplink data apportionment defining what portion of the uplink data flow the UE should provide on the first connection versus what portion of the uplink data flow the UE should provide on the second connection. And at block 36, the method includes causing the UE to operate in accordance with the determined uplink data apportionment.

In line with the discussion above, the act of determining the uplink data apportionment is further based on uplink noise on the first connection and uplink noise on the second connection.

Further, as discussed above, the power headroom of the UE on the first connection could define a difference between a maximum transmit power of the UE on the first connection and a configured transmit power of the UE on the first connection, and the power headroom of the UE on the second connection could define a difference between a maximum transmit power of the UE on the second connection and a configured transmit power of the UE on the second connection.

Still further, as discussed above, the power headroom of the UE on the first connection could vary based on a first power control process carried out by the UE and the first access node, and the power headroom of the UE on the second connection could vary based on a second power control process carried out by the UE and the second access node. And, with dynamic power sharing for instance, the power headroom of the UE on the first connection could the maximum transmit power of the UE on the second connection.

As additionally discussed above, the act of determining the uplink data apportionment based at least on the power headroom of the UE on the first connection and the power headroom of the UE on the second connection could involve determining the uplink data apportionment based on a comparison of the power headroom of the UE on the first connection with the power headroom of the UE on the second connection, perhaps based on (e.g., as) a ratio of the power headroom of the UE on the first connection to the power headroom of the UE on the second connection.

Further, as noted above, the act of determining the uplink data apportionment based on the power headroom of the UE on the first connection and the power headroom of the UE on the second connection could involve determining that the power headroom of the UE on the first connection is at least as low as a defined threshold and the power headroom of the UE on the second connection is not at least as low as the defined threshold and, based at least on that determination, determining that the uplink data apportionment will be 100% on the second connection and 0% on the first connection.

Or the act of determining the uplink data apportionment based on the power headroom of the UE on the first connection and the power headroom of the UE on the second connection could involve determining that the power headroom of the UE on the first connection is lower than the power headroom of the UE on the second connection by at least a defined threshold and, based at least on that determination, determining that the uplink data apportionment will be 100% on the second connection and 0% on the first connection.

Still further, as discussed above, this method could be carried out by the first or second access node, in which case the act of causing the UE to operate in accordance with the determined uplink data apportionment could involve transmitting to the UE a directive to which the UE is configured to respond by setting itself to apply the determined data apportionment. Or the method could be carried out by the UE, in which case the act of causing the UE to operate in accordance with the determined uplink data apportionment could involve the UE setting itself to apply the determined uplink data apportionment.

Yet further, as discussed above, the method could be carried out repeatedly, changing the uplink data apportionment as the power headroom of the UE on the first connection changes and/or as the power headroom of the UE on the second connection changes.

Figure 3:
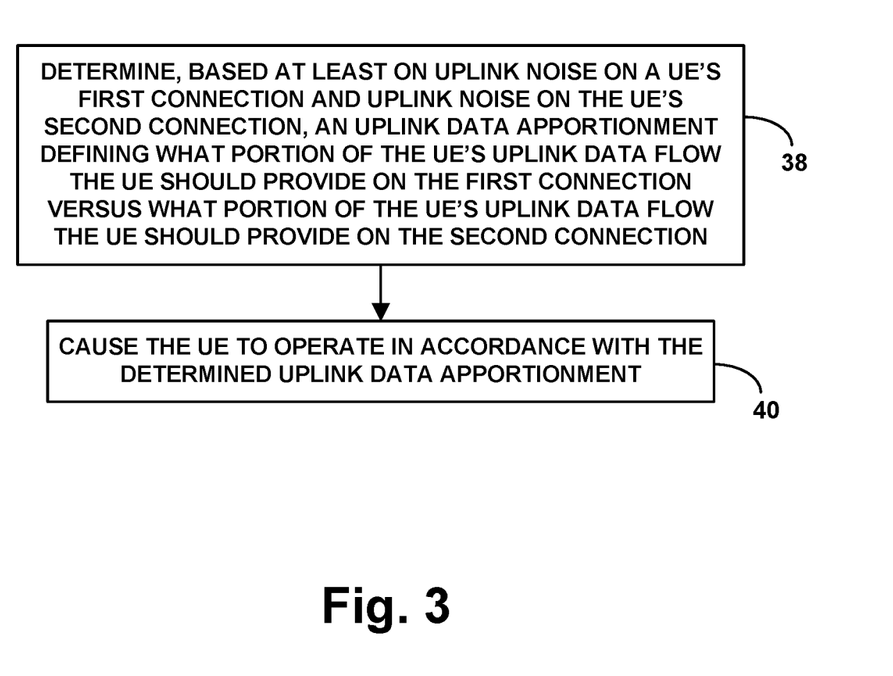
FIG. 3 is another flow chart depicting an example method in accordance with the disclosure.

FIG. 3 is next a flow chart depicting a method that could be carried out in accordance with the present disclosure, to control apportionment of uplink data flow of a dual-connected UE. Here too, the method could be operable in a communication system including first and second access nodes, in a scenario where the UE has coexisting air-interface connections with the access nodes, including a first connection with the first access node and a second connection with the second access node.

As shown in FIG. 3, at block 38, the method includes determining, based at least on uplink noise on first connection and uplink noise on the second connection, an uplink data apportionment defining what portion of the uplink data flow the UE should provide on the first connection versus what portion of the uplink data flow the UE should provide on the second connection. And at block 40, the method includes causing the UE to operate in accordance with the determined uplink data apportionment.

In line with the discussion above, the first connection could be defined on a first carrier that has a first uplink frequency channel, and the uplink noise on the first connection could be measured by the first access node by measuring electromagnetic energy on the first uplink frequency channel in absence of scheduled uplink transmission to the first access node on the first uplink frequency channel. And likewise, the second connection could be defined on a second carrier having a second uplink frequency channel, and the uplink noise on the second connection could be measured by the second access node by measuring electromagnetic energy on the second uplink frequency channel in absence of scheduled uplink transmission to the second access node on the second uplink frequency channel.

Further, as discussed above, the act of determining the uplink data apportionment based at least on the uplink noise on the first connection and the uplink noise on the second connection could involve determining the uplink data apportionment based on a comparison of the uplink noise on the first connection with the uplink noise on the second connection, perhaps based on (e.g., as) an inverse ratio of the uplink noise on the first connection to uplink noise on the second connection.

Still further, as discussed above, the act of determining the uplink data apportionment based on the uplink noise on the first connection and the uplink noise on the second connection could involve determining that the uplink noise on the first connection is at least as high as a defined threshold and the uplink noise on the second connection is not at least as high as the defined threshold and, based at least on that determination, determining that the uplink data apportionment will be 100% on the second connection and 0% on the first connection.

Or the act of determining the uplink data apportionment based on the uplink noise on the first connection and the uplink noise on the second connection could involve determining that the uplink noise on the first connection is higher than the uplink noise on the second connection by at least a defined threshold and, based at least on that determination, determining that the uplink data apportionment will be 100% on the second connection and 0% on the first connection.

In addition, as noted above, this method could be carried out repeatedly, changing the uplink data apportionment as the uplink noise on the first connection changes and/or as the uplink noise on the second connection changes.

Figure 4:
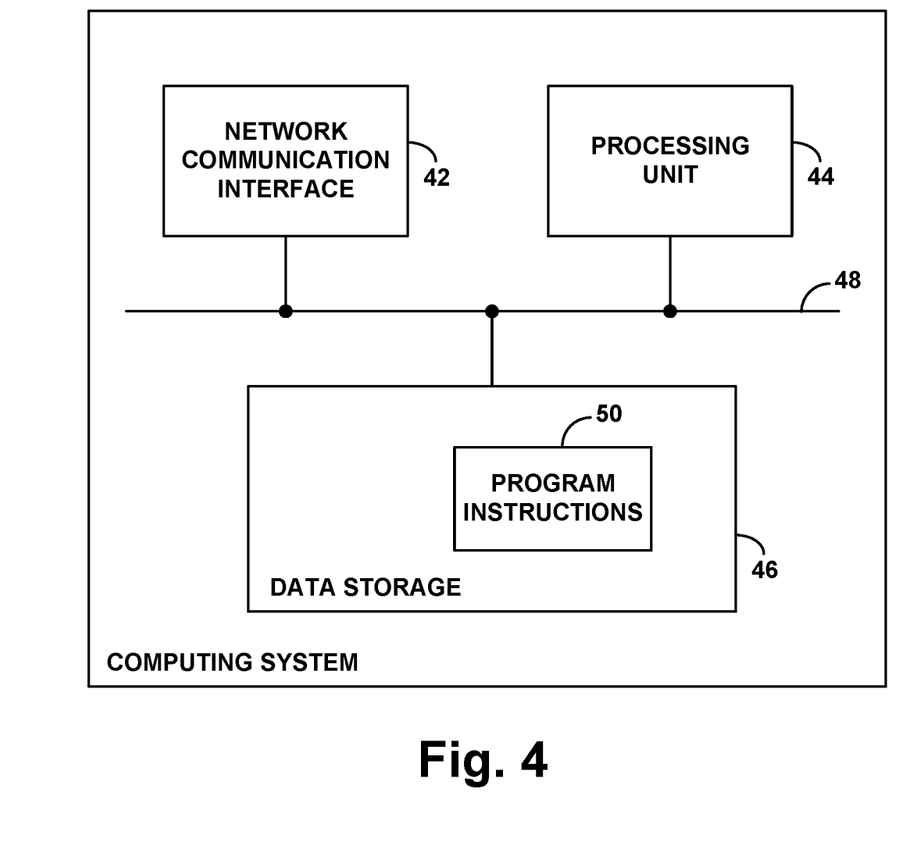
FIG. 4 is a simplified block diagram of an example computing system operable in accordance with the disclosure.

FIG. 4 is a simplified block diagram of an example computing system that could be configured to control apportionment of uplink data flow of a dual-connected user equipment device (UE) in a communication system including first and second access nodes, such as by carrying out the method of FIG. 2 or the method of FIG. 2. This computing system could be provided at or as either of the access nodes, the UE, or an EMS, among other possibilities.

As shown in FIG. 4, the example computing system includes a network communication interface 42, a processing unit 44, and non-transitory data storage 46, all of which could be integrated together and/or interconnected by a system bus, network, or other connection mechanism 48.

The network communication interface 42 could comprise a physical network connector and associated communication logic to facilitate network communication with various other entities. The processing unit 44 could comprise one or more general purpose processors (e.g., microprocessors) and/or one or more special-purpose processors (e.g., application specific integrated circuits). And the data storage 46 could comprise one or more volatile and/or non-volatile storage components (e.g., magnetic, optical, or flash storage).

As shown, the data storage 46 could then store program instructions 50, which could be executable by the processing unit 44 to cause the computing system to carry out various operations described herein.

For instance, the operations could include determining an uplink data apportionment of the UE when the UE has co-existing air-interface connections with the access nodes, including a first connection with the first access node and a second connection with the second access node, the uplink data apportionment defining what portion of the uplink data flow the UE should provide on the first connection versus what portion of the uplink data flow the UE should provide on the second connection. And as noted above, the act of determining the uplink data apportionment could be based on (i) a comparison of uplink power headroom of the UE on the first connection with uplink power headroom of the UE on the second connection and/or (ii) a comparison of uplink noise on the first connection with uplink noise on the second connection. Further, the operations could include causing the UE to operate in accordance with the determined uplink data apportionment.

Various features described above can be implemented in this context as well, and vice versa.

Figure 5:
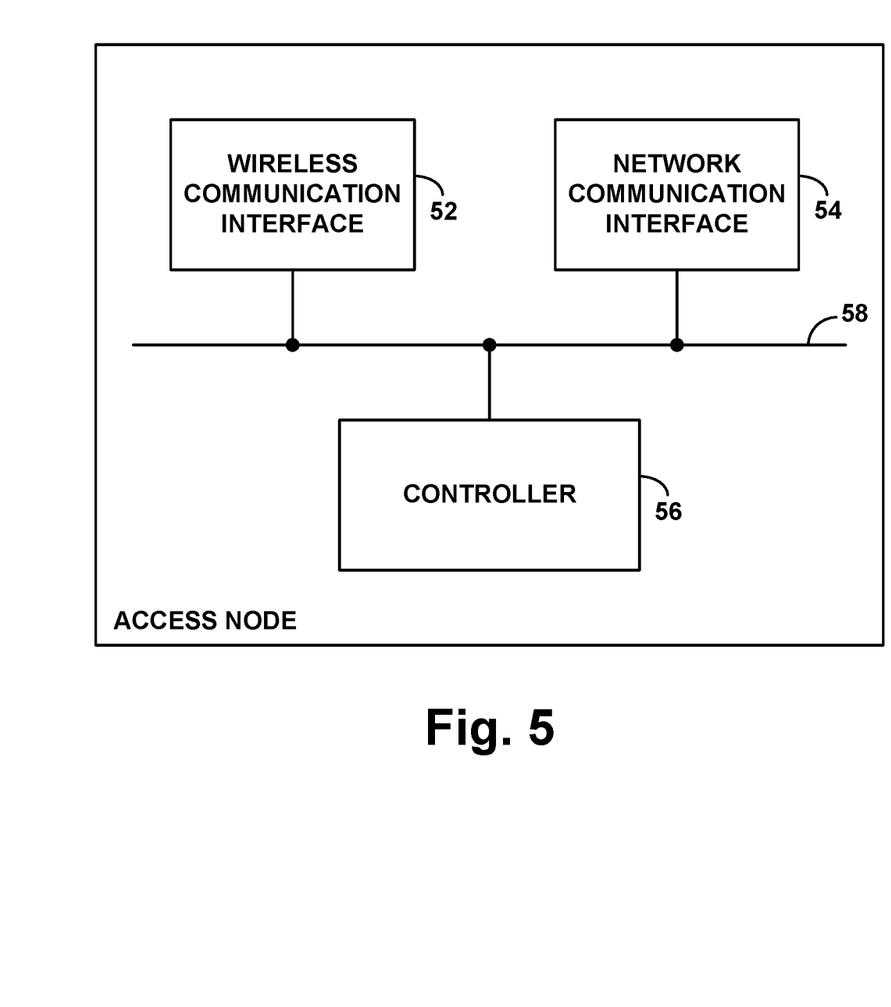
FIG. 5 is a simplified block diagram of an example access node operable in accordance with the disclosure.

FIG. 5 is next a simplified block diagram of an example access node that could be configured to carry out various features described herein. As shown, the example access node includes a wireless communication interface 52, a network communication interface 54, and a controller 56, all of which could be integrated together and/or communicatively linked together by a system bus, network, or other connection mechanism 58.

In an example implementation, the wireless communication interface 52 could comprise an antenna structure, which could be tower mounted or could take other forms, and associated components such as a power amplifier and a wireless transceiver, so as to facilitate providing a coverage area defining an air interface and engaging air-interface communication on the air interface. And the network communication interface 54 could comprise a wired or wireless interface, such as an Ethernet network communication interface, configured to support communication with other entities, such as with the other access nodes and various core-network entities.

Further, controller 56 could comprise one or more processing units (e.g., one or more general purpose processors and/or specialized processors) programmed to cause the access node to carry out various operations such as those discussed herein. For instance, the controller could comprise one or more non-transitory data storage units (e.g., one or more magnetic, optical, or flash storage components) which could store program instructions executable by the one or more processing units to cause the access node to carry out such operations.

Various other features discussed herein can be implemented in this context as well, and vice versa.

Figure 6:
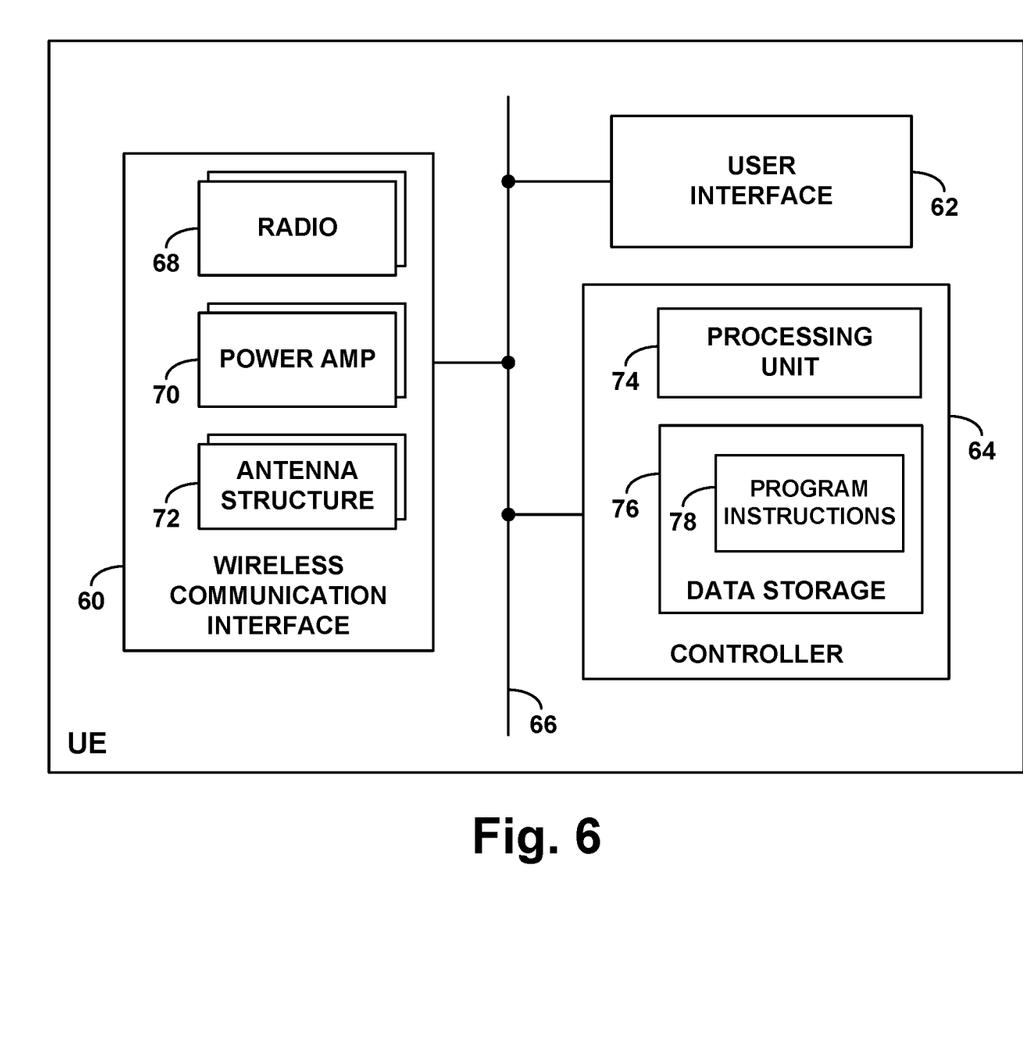
FIG. 6 is a simplified block diagram of an example UE operable in accordance with the disclosure.

Finally, FIG. 6 is a simplified block diagram of an example UE that could be configured to carry out various features described herein. As shown in FIG. 6, the example UE includes a wireless communication interface 60, a user interface 62, and a controller 64. These components could be interconnected, integrated, and/or communicatively linked together in various ways now known or later developed, such as by a system bus or other connection mechanism 66 for instance.

The wireless communication interface 60 could operate to support and thus facilitate air interface communication concurrently on a first connection and a second connection, and the wireless communication interface could operate to support and thus facilitate variable transmit power of the UE respectively on each connection. As shown, for instance, the wireless communication interface could include multiple radios 68, multiple variable-gain power amplifiers 70 governing uplink transmit power of the UE on the connections, and one or more antenna structures 72.

The user interface 62, which could be included if the UE is user operated, could include input and output components (not shown) to facilitate interaction with a user. For instance, the user interface could include analog-to-digital conversion circuitry and could include input components such as a touch screen, microphone, and keypad, and output components such as a display screen and sound speaker.

And the controller 64, which could be integrated with wireless communication interface 60 (e.g., on a common chipset) or provided in another manner, could operate to carry out or cause the UE to carry out various operations described herein. As shown, controller 64 could include at least one processing unit 74 (e.g., one or more general purpose processors such as microprocessors and/or one or more special purpose processors such as application specific integrated circuits), and non-transitory data storage 76 (e.g., one or more volatile and/or non-volatile storage components, such as magnetic, optical and/or flash storage). And non-transitory data storage 76 could hold program instructions 78, which could be executable by the processing unit 66 to carry out the various described operations. Alternatively, the controller could take other forms.

Various other features discussed herein can be implemented in this context as well, and vice versa.

The present disclosure also contemplates at least one non-transitory computer readable medium having stored thereon (e.g., being encoded with) program instructions executable by at least one processing unit to carry out various operations described above.

Exemplary embodiments have been described above. Those skilled in the art will understand, however, that changes and modifications may be made to these embodiments without departing from the true scope and spirit of the invention.

What is claimed is:

1. A method for controlling apportionment of uplink data flow of a dual-connected user equipment device (UE), wherein the method is operable in a communication system including first and second access nodes when the UE has co-existing air-interface connections with the access nodes, including a first connection with the first access node and a second connection with the second access node, the method comprising:

determining, based at least on a power headroom of the UE on the first connection and a power headroom of the UE on the second connection, an uplink data apportionment defining what portion of the uplink data flow the UE should provide on the first connection versus what portion of the uplink data flow the UE should provide on the second connection; and causing the UE to operate in accordance with the determined uplink data apportionment, wherein determining the uplink data apportionment based on the power headroom of the UE on the first connection and the power headroom of the UE on the second connection comprises an action selected from the group consisting of
- (i) determining that the power headroom of the UE on the first connection is at least as low as a defined threshold and the power headroom of the UE on the second connection is not at least as low as the defined threshold, and, based at least on the determining that the power headroom of the UE on the first connection is at least as low as the defined threshold and the power headroom of the UE on the second connection is not at least as low as the defined threshold, determining that the uplink data apportionment will be 100% on the second connection and 0% on the first connection, and
- (ii) determining that the power headroom of the UE on the first connection is lower than the power headroom of the UE on the second connection by at least a defined delta threshold, and, based at least on the determining that the power headroom of the UE on the first connection is lower than the power headroom of the UE on the second connection by at least the defined delta threshold, determining that the uplink data apportionment will be 100% on the second connection and 0% on the first connection.

2. The method of claim 1, wherein determining the uplink data apportionment is further based on uplink noise on the first connection and uplink noise on the second connection.

3. The method of claim 1,
wherein the power headroom of the UE on the first connection defines a difference between a maximum transmit power of the UE on the first connection and a configured transmit power of the UE on the first connection; and
wherein the power headroom of the UE on the second connection defines a difference between a maximum transmit power of the UE on the second connection and a configured transmit power of the UE on the second connection.

4. The method of claim 3, wherein the power headroom of the UE on the first connection varies based on a first power control process carried out by the UE and the first access node, and wherein the power headroom of the UE on the second connection varies based on a second power control process carried out by the UE and the second access node.

5. The method of claim 3, wherein the power headroom of the UE on the first connection defines the maximum transmit power of the UE on the second connection.

6. The method of claim 1, wherein determining the uplink data apportionment based at least on the power headroom of the UE on the first connection and the power headroom of the UE on the second connection comprises determining the uplink data apportionment based on a comparison of the power headroom of the UE on the first connection with the power headroom of the UE on the second connection.

7. The method of claim 6, wherein determining the uplink data apportionment based on the comparison of the power headroom of the UE on the first connection with the power headroom of the UE on the second connection comprises determining the uplink data apportionment based on a ratio of the power headroom of the UE on the first connection to the power headroom of the UE on the second connection.

8. The method of claim 1, wherein determining the uplink data apportionment based on the power headroom of the UE on the first connection and the power headroom of the UE on the second connection comprises:
determining that the power headroom of the UE on the first connection is at least as low as the defined threshold and the power headroom of the UE on the second connection is not at least as low as the defined threshold; and
based at least on the determining that the power headroom of the UE on the first connection is at least as low as the defined threshold and the power headroom of the UE on the second connection is not at least as low as the defined threshold, determining that the uplink data apportionment will be 100% on the second connection and 0% on the first connection.

9. The method of claim 1, wherein determining the uplink data apportionment based on the power headroom of the UE on the first connection and the power headroom of the UE on the second connection comprises:
determining that the power headroom of the UE on the first connection is lower than the power headroom of the UE on the second connection by at least the defined delta threshold; and
based at least on the determining that the power headroom of the UE on the first connection is lower than the power headroom of the UE on the second connection by at least the defined delta threshold, determining that the uplink data apportionment will be 100% on the second connection and 0% on the first connection.

10. The method of claim 1, wherein the method is carried out by one of the first and second access nodes, and wherein causing the UE to operate in accordance with the determined uplink data apportionment comprises transmitting to the UE a directive to which the UE is configured to respond by setting itself to apply the determined data apportionment.

11. The method of claim 1, wherein the method is carried out by the UE, and wherein causing the causing the UE to operate in accordance with the determined uplink data apportionment comprises the UE setting itself to apply the determined uplink data apportionment.

12. The method of claim 1, wherein the method is carried out repeatedly, changing the uplink data apportionment as the power headroom of the UE on the first connection changes and/or as the power headroom of the UE on the second connection changes.

13. A method for controlling apportionment of uplink data flow of a dual-connected user equipment device (UE), wherein the method is operable in a communication system including first and second access nodes when the UE has co-existing air-interface connections with the access nodes, including a first connection with the first access node and a second connection with the second access node, the method comprising:
determining, based at least on uplink noise on the first connection and uplink noise on the second connection, an uplink data apportionment defining what portion of the uplink data flow the UE should provide on the first connection versus what portion of the uplink data flow the UE should provide on the second connection; and
causing the UE to operate in accordance with the determined uplink data apportionment,
wherein determining the uplink data apportionment based on the uplink noise on the first connection and the uplink noise on the second connection comprises an action selected from the group consisting of:
(i) determining that the uplink noise on the first connection is at least as high as a defined threshold and the uplink noise on the second connection is not at least as high as the defined threshold, and, based at least on the determining that the uplink noise on the first connection is at least as high as a defined threshold and the uplink noise on the second connection is not at least as high as the defined threshold, determining that the uplink data apportionment will be 100% on the second connection and 0% on the first connection, and (ii) determining that the uplink noise on the first connection is higher than the uplink noise on the second connection by at least a defined delta threshold, and, based at least on the determining that the uplink noise on the first connection is higher than the uplink noise on the second connection by at least the defined delta threshold, determining that the uplink data apportionment will be 100% on the second connection and 0% on the first connection.

14. The method of claim 13,
wherein the first connection is on a first carrier having a first uplink frequency channel, and wherein the uplink noise on the first connection is measured by the first access node by measuring electromagnetic energy on the first uplink frequency channel in absence of scheduled uplink transmission to the first access node on the first uplink frequency channel; and
wherein the second connection is on a second carrier having a second uplink frequency channel, and wherein the uplink noise on the second connection is measured by the second access node by measuring electromagnetic energy on the second uplink frequency channel in absence of scheduled uplink transmission to the second access node on the second uplink frequency channel.

15. The method of claim 13, wherein determining the uplink data apportionment based at least on the uplink noise on the first connection and the uplink noise on the second connection comprises determining the uplink data apportionment based on a comparison of the uplink noise on the first connection with the uplink noise on the second connection.

16. The method of claim 13, wherein determining the uplink data apportionment based at least on the uplink noise on the first connection and the uplink noise on the second connection comprises determining the uplink data apportionment based on an inverse ratio of the uplink noise on the first connection to uplink noise on the second connection.

17. The method of claim 13, wherein determining the uplink data apportionment based on the uplink noise on the first connection and the uplink noise on the second connection comprises:
determining that the uplink noise on the first connection is at least as high as the defined threshold and the uplink noise on the second connection is not at least as high as the defined threshold; and
based at least on the determining that the uplink noise on the first connection is at least as high as the defined threshold and the uplink noise on the second connection is not at least as high as the defined threshold, determining that the uplink data apportionment will be 100% on the second connection and 0% on the first connection.

18. The method of claim 13, wherein determining the uplink data apportionment based on the uplink noise on the first connection and the uplink noise on the second connection comprises:
determining that the uplink noise on the first connection is higher than the uplink noise on the second connection by at least the defined delta threshold; and
based at least on the determining that the uplink noise on the first connection is higher than the uplink noise on the second connection by at least the defined delta threshold, determining that the uplink data apportionment will be 100% on the second connection and 0% on the first connection.

19. The method of claim 13, wherein the method is carried out repeatedly, changing the uplink data apportionment as the uplink noise on the first connection changes and/or as the uplink noise on the second connection changes.

20. A computing system operable to control apportionment of uplink data flow of a dual-connected user equipment device (UE) in a communication system including first and second access nodes, the computing system comprising:
a network communication interface;
a processing unit;
non-transitory data storage; and
program instructions stored in the non-transitory data storage and executable by the processing unit to carry out operations including:
determining an uplink data apportionment of the UE when the UE has co-existing air-interface connections with the access nodes, including a first connection with the first access node and a second connection with the second access node, wherein the uplink data apportionment defines what portion of the uplink data flow the UE should provide on the first connection versus what portion of the uplink data flow the UE should provide on the second connection, and wherein determining the uplink data apportionment is based on at least one of (i) a comparison of uplink power headroom of the UE on the first connection with uplink power headroom of the UE on the second connection or (ii) a comparison of uplink noise on the first connection with uplink noise on the second connection, and
causing the UE to operate in accordance with the determined uplink data apportionment,
wherein determining the uplink data apportionment comprises an action selected from the group consisting of:
(i) determining that the power headroom of the UE on the first connection is at least as low as a defined power headroom threshold and the power headroom of the UE on the second connection is not at least as low as the defined power headroom threshold, and, based at least on the determining that the power headroom of the UE on the first connection is at least as low as the defined power headroom threshold and the power headroom of the UE on the second connection is not at least as low as the defined power headroom threshold, determining that the uplink data apportionment will be 100% on the second connection and 0% on the first connection, and
(ii) determining that the power headroom of the UE on the first connection is lower than the power headroom of the UE on the second connection by at least a defined delta power headroom threshold, and, based at least on the determining that the power headroom of the UE on the first connection is lower than the power headroom of the UE on the second connection by at least the defined delta power headroom defined power headroom delta threshold, determining that the uplink data apportionment will be 100% on the second connection and 0% on the first connection,
(iii) determining that the uplink noise on the first connection is at least as high as a defined noise threshold and the uplink noise on the second connection is not at least as high as the defined noise threshold, and, based at least on the determining that the uplink noise on the first connection is at least as high as a defined noise threshold and the uplink noise on the second connection is not at least as high as the defined noise threshold, determining that the uplink data apportionment will be 100% on the second connection and 0% on the first connection, and (iv) determining that the uplink noise on the first connection is higher than the uplink noise on the second connection by at least a defined delta noise threshold, and, based at least on the determining that the uplink noise on the first connection is higher than the uplink noise on the second connection by at least the defined delta noise threshold, determining that the uplink data apportionment will be 100% on the second connection and 0% on the first connection.

* * * * *